United States Patent
Guise et al.

(10) Patent No.: US 11,835,971 B2
(45) Date of Patent: Dec. 5, 2023

(54) PRESSURE REDUCING VALVE WITH AN INTEGRAL VENTURI

(71) Applicant: Zurn Industries, LLC, Milwaukee, WI (US)

(72) Inventors: Matthew Guise, Paso Robles, CA (US); William M. Orr, Paso Robles, CA (US); Christopher Corral, Paso Robles, CA (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 272 days.

(21) Appl. No.: 17/458,145

(22) Filed: Aug. 26, 2021

(65) Prior Publication Data

US 2021/0389785 A1 Dec. 16, 2021

Related U.S. Application Data

(63) Continuation of application No. 16/851,540, filed on Apr. 17, 2020, now Pat. No. 11,106,227.

(60) Provisional application No. 62/843,165, filed on May 3, 2019.

(51) Int. Cl.
*G05D 16/06* (2006.01)
*F16K 1/36* (2006.01)

(52) U.S. Cl.
CPC ........... *G05D 16/0638* (2013.01); *F16K 1/36* (2013.01)

(58) Field of Classification Search
CPC ....................................................... F16K 1/36
See application file for complete search history.

(56) References Cited

U.S. PATENT DOCUMENTS

| 2,308,187 A | 1/1943 | MacLean et al. |
| 2,323,888 A | 7/1943 | Wright |
| 2,599,577 A | 6/1952 | Norgren |
| 2,755,815 A | 7/1956 | Erle |
| 2,833,304 A | 5/1958 | Fish |
| 2,890,713 A | 6/1959 | Semon |
| 3,204,675 A | 9/1965 | Griffin |
| 3,211,174 A | 10/1965 | Weise et al. |

(Continued)

FOREIGN PATENT DOCUMENTS

| CN | 108506084 A | 9/2018 |
| EP | 0309044 B1 | 2/1994 |

(Continued)

*Primary Examiner* — Eric Keasel
(74) *Attorney, Agent, or Firm* — Husch Blackwell LLP

(57) ABSTRACT

A pressure reducing valve includes a valve housing, plunger, pressure sensing cavity, and biasing member. The valve housing includes a valve inlet and valve outlet in selective fluid communication with each other. The plunger is in the valve housing and movable between a closed position and open position. The plunger is positioned downstream from the valve inlet and upstream from the valve outlet. The plunger includes a venturi and a channel. The venturi is within the plunger and has a venturi inlet and venturi outlet. The channel is within the plunger and is in fluid communication with the venturi. The pressure sensing cavity is in fluid communication with the channel. The biasing member exerts a biasing force on the plunger toward the open position. The channel is in fluid communication with the pressure sensing cavity to provide a fluid pressure that is lower than the outlet pressure during flow.

15 Claims, 9 Drawing Sheets

(56) References Cited

U.S. PATENT DOCUMENTS

| | | |
|---|---|---|
| 3,285,280 A | 11/1966 | Bryant |
| 3,331,590 A | 7/1967 | Battenfeld et al. |
| 3,601,148 A | 8/1971 | Jeffrey et al. |
| 3,643,683 A | 2/1972 | Semon |
| 3,792,713 A | 2/1974 | Zadoo |
| 3,957,075 A | 5/1976 | Kunz et al. |
| 4,539,960 A | 9/1985 | Cowles |
| 5,183,074 A | 2/1993 | Reese |
| 5,359,977 A | 11/1994 | Abbey |
| 5,465,751 A | 11/1995 | Newton |
| 5,908,098 A | 6/1999 | Gorman et al. |
| 6,161,539 A | 12/2000 | Winter |
| 6,729,331 B2 | 5/2004 | Kay |
| 6,832,625 B2 | 12/2004 | Ford |
| 8,978,692 B2 | 3/2015 | Heron et al. |
| 9,644,349 B2 | 5/2017 | Burrows |
| 11,106,227 B2 * | 8/2021 | Guise ........................ F16K 1/36 |
| 2011/0162730 A1 | 7/2011 | Gotthelf |
| 2011/0297252 A1 | 12/2011 | Hurley et al. |
| 2018/0052474 A1 | 2/2018 | Leng et al. |
| 2018/0112630 A1 | 4/2018 | Ehlig et al. |

FOREIGN PATENT DOCUMENTS

| | | |
|---|---|---|
| FR | 2466800 A1 | 4/1981 |
| GB | 707429 A | 4/1954 |
| GB | 717509 A | 10/1954 |
| GB | 761160 A | 11/1956 |
| GB | 827293 A | 2/1960 |
| GB | 884558 A | 12/1961 |
| GB | 910342 A | 11/1962 |
| GB | 1059809 A | 2/1967 |
| GB | 2036382 B | 1/1983 |
| GB | 2239689 A | 7/1991 |
| GB | 2284687 A | 6/1995 |
| GB | 2405957 A | 3/2005 |
| GB | 2448086 A | 10/2008 |
| KR | 101122763 B1 | 3/2012 |
| WO | 2006027145 A1 | 3/2006 |
| WO | 2018033863 A1 | 2/2018 |

* cited by examiner

PRESSURE REDUCING VALVE WITH AN INTEGRAL VENTURI

CROSS-REFERENCE TO RELATED APPLICATION

The present application is a continuation of U.S. patent application Ser. No. 16/851,540, filed on Apr. 17, 2020, which claims priority to U.S. Provisional Patent Application No. 62/843,165 filed on May 3, 2019, the entire contents of which are incorporated by reference herein.

FIELD

This application relates to pressure reducing valves.

BACKGROUND

Pressure reducing valves are required in many hydraulic, pneumatic, fuel, and water management systems. Typically, pressure reducing valves are used to reduce the inlet pressure to a set output fluid pressure. For example, the inlet fluid pressure of 100 pounds per square inch ("psi") is set to a reduced outlet fluid pressure of 65 psi. In most cases, the pressure reducing valve operates as a balance of forces on the sealing component (for example, a piston or a diaphragm), where a compressive force of a spring can be used to set the outlet fluid pressure. The additional forces involved in the force balance can include the outlet fluid pressure. In some cases, changing the compressive force of the spring can adjust the set outlet fluid pressure.

Current pressure reducing valves often experience a deviation from the set outlet fluid pressure. For example, as downstream demand or an outlet flow rate increases (for example, via opening of additional faucets), the sealing component of the pressure reducing valve opens in response. Correspondingly, the additional opening of the pressure reducing valve imposes a proportional decrease in outlet fluid pressure known as fall off pressure, which is the difference between the downstream set static pressure and the flowing water pressure.

SUMMARY

Conventional pressure reducing valves have no way to compensate for changes in outlet fluid pressure, due to fluctuations in outlet fluid flow rate (e.g., increases in downstream demand). Other pressure reducing valve configurations contemplate placing an external venturi at the outlet side of the pressure reducing valve to provide feedback that adjusts the amount the pressure reducing valve is open. In such a construction, the fluid pressure at a constriction within the venturi is taken and this is used to adjust the degree to which the valve is open within the valve housing, via a pipe conduit, in order to alleviate and stabilize the amount of fall-off pressure. Unfortunately, this can lead to a rather bulky system that may not fit an enclosure, where the pressure reducing valve is installed. Further, the pipe conduit itself and connections between pipe conduit and the valve can be exposed and potentially damageable, when compared to the valve housing itself, and is thus prone to leaks (e.g., from fractures).

Disclosed herein is an improved pressure reducing valve, which addresses the above-discussed deficiencies with prior pressure reducing valve designs. For example, the disclosed pressure reducing valve includes an integrally formed venturi and channel within a plunger of the pressure reducing valve. The channel is configured to be in fluid communication with a constriction of the venturi and a pressure sensing cavity. When the outlet fluid flow rate fluctuates, the integrally-formed venturi in the plunger senses this change in outlet fluid flow rate and adjusts a force imposed on the plunger, effectively eliminating or greatly reducing any undesirable pressure drops or fall-off. The integration of the venturi and channel into the plunger maintains the compact nature of the pressure reducing valve. Additionally, the manufacturing of the channel and venturi within the plunger is relatively simple to fabricate and effectively avoids the exposure of the pipe conduit that would be present in an external venturi design. Lastly, the integrated venturi and channel within the plunger significantly decreases the length of the required channel, when compared to an external venturi with pipe conduit design.

According to one aspect, a pressure reducing valve is provided. The pressure reducing valve includes a valve housing including an inlet in selective fluid communication with an outlet and a plunger positioned between the inlet and the outlet in which the plunger is coupled to a biasing member including a diaphragm and/or piston having a pressure sensing cavity. A venturi is integrally formed within the plunger. The venturi has a venturi inlet and a venturi outlet with a venturi constriction therebetween. A channel is also integrally formed within the plunger with the channel providing fluid communication between the venturi constriction and the pressure sensing cavity. The venturi constriction is configured to sense and deliver a fluid pressure to the pressure sensing cavity of the biasing member via the channel to adjust a biasing force applied to the plunger by the biasing member.

In some forms of the system, the plunger can include a stem and a head coupled to the stem. In more specific configurations, the venturi can be integrally formed within a head of the plunger and the channel can be integrally formed within a stem of the plunger, with the channel being generally perpendicular relative to the venturi.

In some forms of the system, the biasing member can further include a spring along with a diaphragm and/or piston. Additionally, the stem of the plunger can be concentrically positioned relative to the spring, with the spring surrounding (at least in part) the stem of the plunger.

In some forms of the system, a force of the spring and a force of the diaphragm and/or piston are in opposite directions to one another and are summed to establish the biasing force applied to the plunger. In specific configurations, the spring may not be within the pressure sensing cavity and the spring and pressure sensing cavity may be axially stacked relative to one another. To permit adjustment of the reduction of pressure, the pressure reducing valve can include an adjustment assembly for the biasing member. The adjustment assembly can, for example, include a bolt or other rotating member and may rotate in a first direction to axially load the spring and can rotate in a second direction to unload the spring. This amount of rotation of the biasing member can correspond to an outlet fluid pressure of the outlet.

In some forms of the system, the diaphragm and/or piston may be sealingly engaged with the plunger, which can define a portion of the pressure sensing cavity.

In some forms of the system, the pressure reducing valve can include a guide positioned within the valve housing. In some cases, the guide can include an axial bore that receives the plunger, where the plunger can translate within the axial bore of the guide. Additionally, the guide can include an aperture in selective fluid communication with the axial bore, with the aperture having a smaller radius than the axial bore.

In some forms of the system, the guide can include an opening adjacent to the aperture and on the opposite side of the aperture from the axial bore providing a flow path. Accordingly, the opening can allow selective fluid communication between the opening and the aperture. It is also contemplated that the guide may not have an axial bore, but that there may be an opening that can be selectively sealed or opened to open or restrict a flow path through the opening.

In some forms of the system, the head of the plunger can be configured to engage a surface of the axial bore which can prevent fluid communication between the opening and the axial bore. In a more general sense, the plunger can be used to selectively seal an opening to create or block a flow path through the guide regardless of whether there is an axial bore or not.

According to another aspect, a method for reducing a fluid pressure loss during a fluid flow when the fluid flow increases for a system is provided. The system includes a pressure reducing valve, in which the pressure reducing valve has a housing defining an inlet and an outlet, a biasing member, and a plunger coupled to a diaphragm and/or piston defining a pressure sensing cavity. The method includes sensing a pressure change due to the fluid flow through a venturi integrated within the plunger, where the venturi has a venturi constriction. The method also includes delivering a fluid pressure of the venturi constriction to the pressure sensing cavity via a channel and based on the fluid flow through the venturi, where the channel is in fluid communication with the pressure sensing cavity and the venturi constriction. The channel is also integrated within the plunger. The method further includes adjusting a load imposed on the plunger due to the fluid pressure within the pressure sensing cavity.

In some forms of the method, the plunger can be coupled to the biasing member which includes the diaphragm and/or piston. In some cases, the load imposed by the biasing member onto the plunger translates the plunger.

In some forms of the method, an increase in the fluid pressure of the venturi constriction translates the plunger thereby decreasing a distance between a head of the plunger and an aperture. The aperture can provide selective fluid communication between the inlet and the outlet.

In some forms of the method, a decrease in the fluid pressure of the venturi constriction can translate the plunger thereby increasing the distance between a head of the plunger and an aperture. The aperture can provide selective fluid communication between the inlet and the outlet.

In some forms of the method, by virtue of the venturi in the plunger, the fluid pressure loss at increased flow rates can be reduced relative a fluid pressure loss in a similar pressure reducing valve but lacking the venturi in the plunger.

According to still another aspect, a pressure reducing valve is disclosed. The pressure reducing valve includes a valve housing including an inlet in selective fluid communication with an outlet, a plunger coupled to a biasing member including a diaphragm and/or piston having a pressure sensing cavity in which the plunger is positioned between the inlet and the outlet, and a low pressure sensing feature within the plunger and in communication with the pressure sensing cavity. The low pressure sensing feature is configured to sense and deliver a fluid pressure to the pressure sensing cavity of the biasing member and adjust a biasing force applied to the plunger by the biasing member.

In some forms, the low pressure sensing feature may have an inlet and an outlet with a low pressure zone therebetween and the pressure reducing valve further may further include a channel integrally formed within the plunger that provides fluid communication between the low pressure zone and the pressure sensing cavity. In some forms, the pressure reducing valve may further include a constriction between the inlet and the outlet and the low pressure zone may be positioned just after the constriction and the channel to the pressure sensing cavity may positioned just after the construction.

In other forms, the various features described above with respect to the first aspect of the valve could be employed in this additional aspect of the valve, albeit with the venturi being replaced by a low pressure sensing feature more generally.

According to still yet another aspect, a method for reducing a fluid pressure loss during a fluid flow when the fluid flow increases for a system that includes a pressure reducing valve is disclosed in which the pressure reducing valve includes a housing defining an inlet and an outlet, a biasing member, a plunger coupled to a diaphragm and/or piston defining a pressure sensing cavity. A pressure change due to the fluid flow through a low pressure sensing feature integrated within the plunger is sensed. The fluid pressure of the low pressure sensing feature is delivered to the pressure sensing cavity from the plunger. A load imposed on the plunger due to the fluid pressure within the pressure sensing cavity is adjusted.

In some forms of the method, the low pressure sensing feature may have an inlet and an outlet with a low pressure zone therebetween and the step of sensing may detect a pressure change in this low pressure zone. In this arrangement, the pressure reducing valve may further include a channel integrally formed within the plunger in which the channel provides fluid communication between the low pressure zone and the pressure sensing cavity. There may be a constriction between the inlet and the outlet and the low pressure zone can be positioned just after the constriction (as the flow path extends from the inlet to the outlet) and the channel to the pressure sensing cavity may be positioned just after the construction.

In other forms, the various features described above with respect to the first aspect of the method could be employed in this additional aspect of the method, albeit with the venturi being replaced by a low pressure sensing feature more generally.

These and still other advantages of the invention will be apparent from the detailed description and drawings. What follows is merely a description of some preferred embodiments of the present invention. To assess the full scope of the invention, the claims should be looked to, as these preferred embodiments are not intended to be the only embodiments within the scope of the claims.

DETAILED DESCRIPTION

Figure 1:
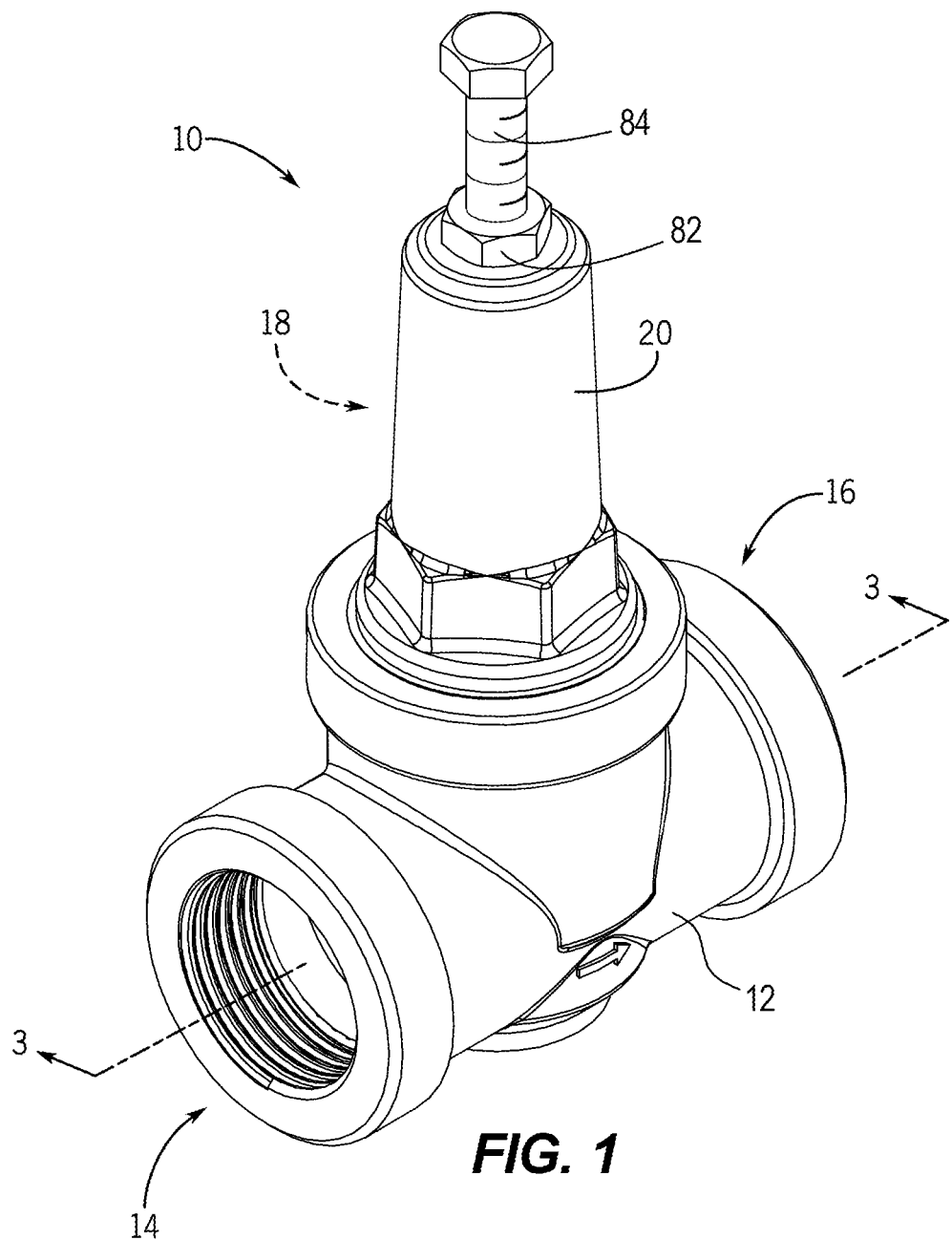
FIG. 1 is a perspective view of a pressure reducing valve.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, "at least one of A, B, and C," and similar phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

As illustrated in FIG. 1, a pressure reducing valve 10 includes a valve housing 12 that defines an inlet 14 and an outlet 16. The pressure reducing valve 10 is installed such that the inlet 14 receives a high pressurized fluid and the outlet 16 expels the fluid at a particular, reduced fluid pressure when fluid is flowing through the valve 10. The pressure reducing valve 10 also includes an adjustment assembly 18 received within an adjustment assembly housing 20, which is coupled to the valve housing 12. In some embodiments, and as illustrated, the adjustment assembly housing 20 is secured to the valve housing 12 by threaded engagement. Additionally or alternatively, the valve housing 12 can be made of various suitable materials (e.g., metals) that sufficiently withstand the various forces of the pressurized fluid.

Figure 2:
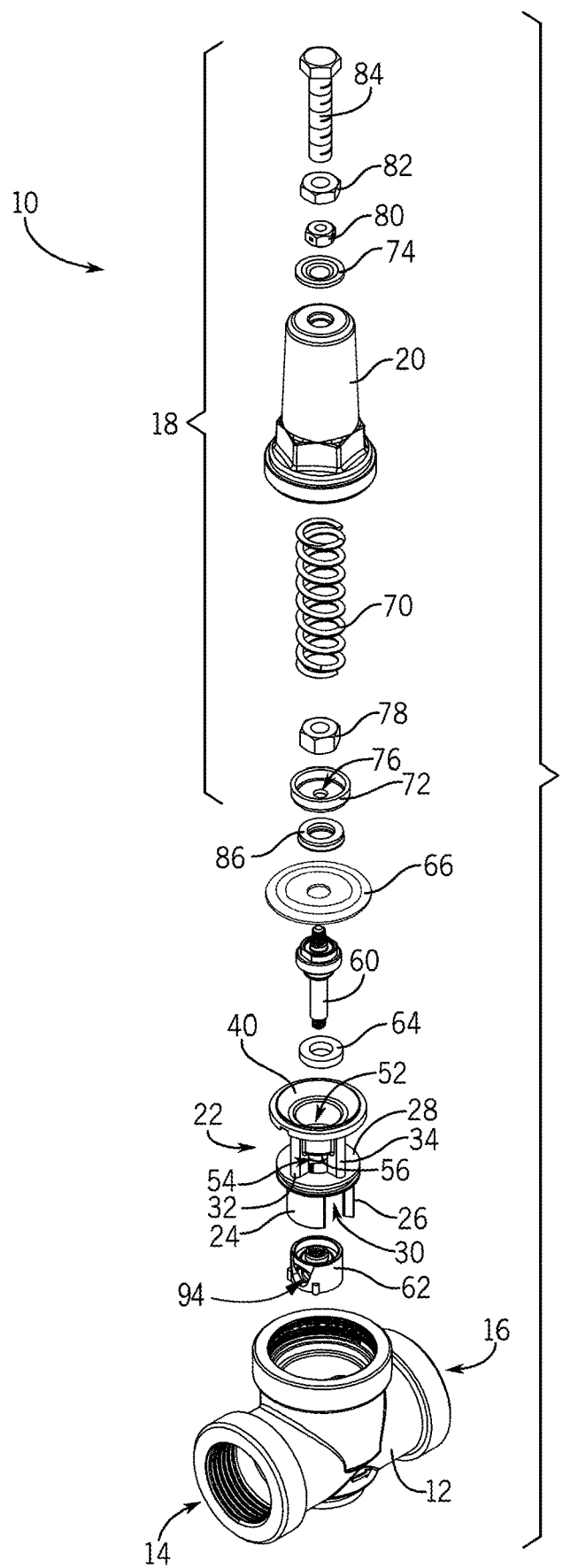
FIG. 2 is an exploded perspective view of the pressure reducing valve of FIG. 1.

Turning now to FIG. 2, the various internal components of the pressure reducing valve 10 are separately shown exploded apart from one another so that the figures that follow and functionality can be better understood. The pressure reducing valve 10 includes a guide 22 positioned within the valve housing 12 and having retaining walls 24, 26 that downwardly protrude from a generally central guide body 28, where the retaining walls 24, 26 define an axial bore 30 centrally there within. However, it is also contemplated that there need not be retaining walls, and the "axial bore" could effectively be an open space in which a plunger is positioned or there could be fewer retaining walls than those illustrated (e.g., wall 26 could be eliminated). With additional reference being made to FIG. 5, the guide 22 also includes upwardly protruding supports 32, 34, 36, 38 that are spaced apart radially and are integrally formed with a ring 40. The positioning of the supports 32, 34, 36, 38 on the ring 40 define openings 42, 44, 46, 48 (most clearly identified in FIG. 5 and are generally radially extending) which are specifically defined by two adjacent ones of the supports 32, 34, 36, 38. For example, the supports 32, 34 define the opening 42, the supports 34, 36 define the opening 44, the supports 36, 38 define the opening 46, and the supports 38, 32 define the opening 48. The ring 40 also includes an axially-extending channel 52 that extends through the entirety of the ring 40 and beyond a bottom surface 54 of the ring 40, via a flange 56 protruding from the bottom surface 54. The guide 22 also includes a circular aperture 50 (see FIG. 5) that extends through the entirety of the guide body 28.

Figure 3:
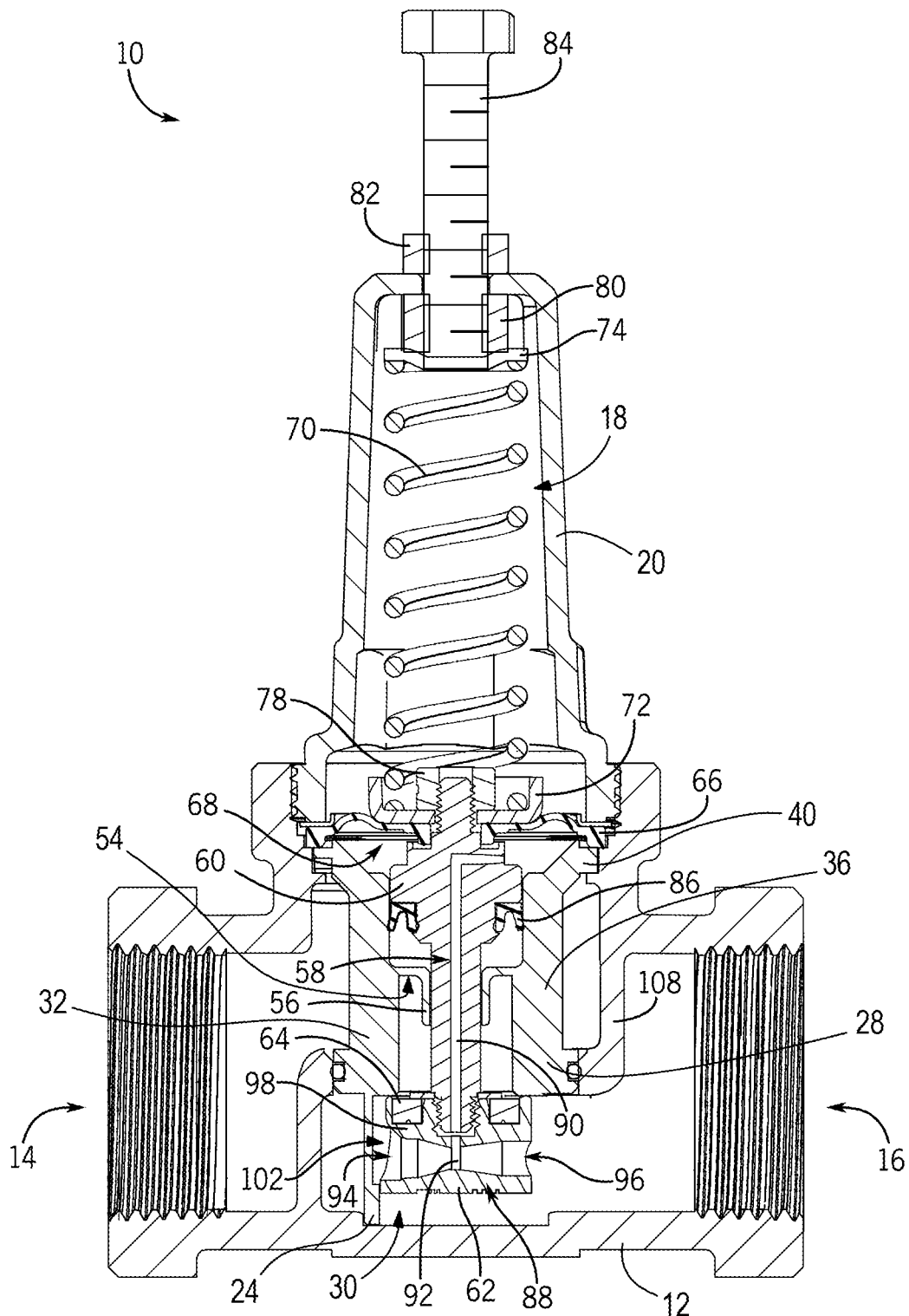
FIG. 3 is a cross-sectional elevation view of the pressure reducing valve of FIG. 1 taken along line 3-3, shown in a closed position.

With reference being made to FIGS. 2 and 3, the pressure reducing valve 10 also includes a plunger 58 having a stem 60 and a head 62. The stem 60 and the head 62 are coupled by threaded engagement thereby securing them together. In some embodiments, the stem 60 and the head 62 can be fixed together by other methods known in the art. The head 62 of the plunger 58 includes a gasket 64 that is placed within a bore or upwardly facing channel on a surface of the head 62 for selectively forming a seal with the guide 22 when the plunger 58 is in the closed position of FIG. 3.

Figure 4:
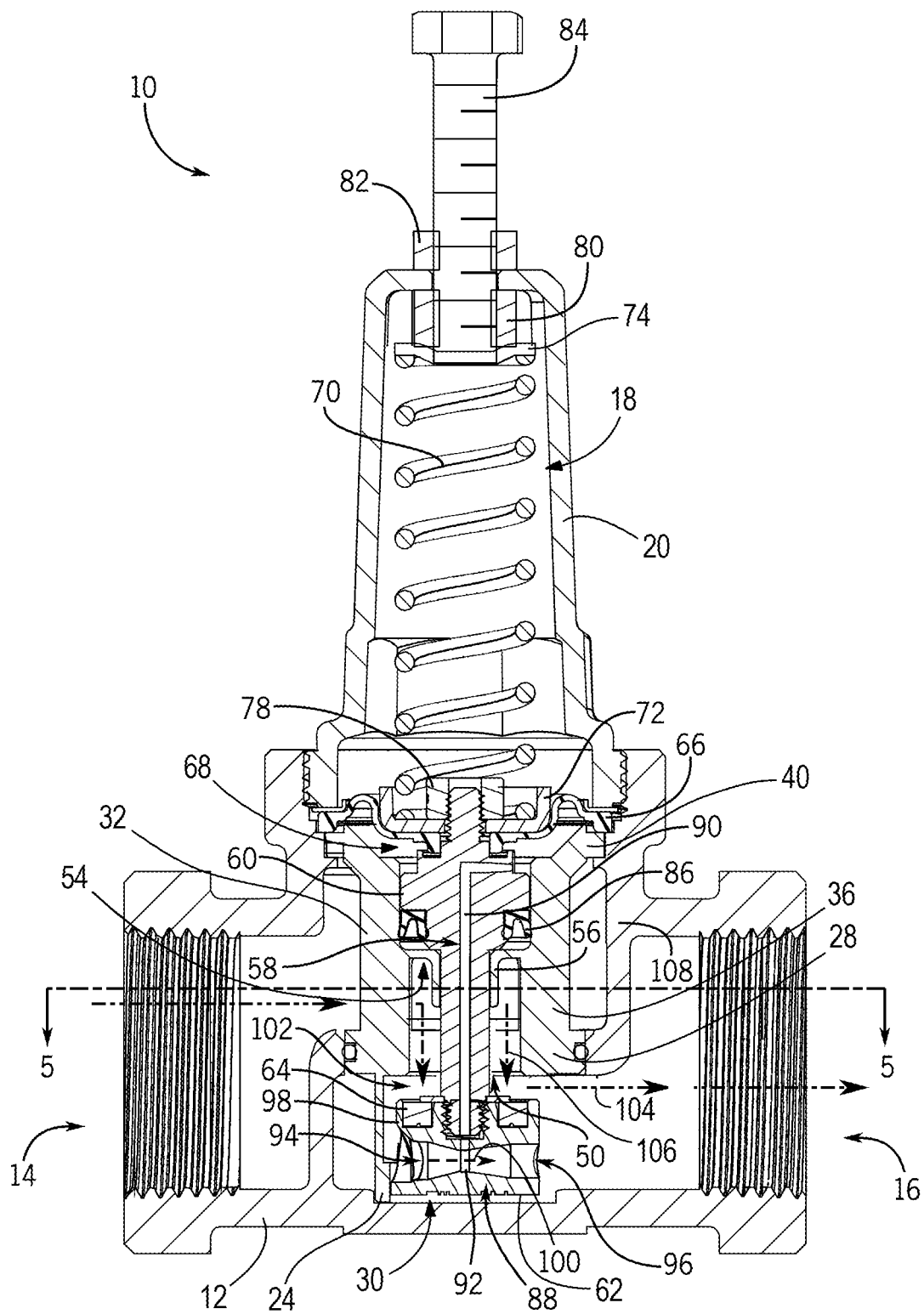
FIG. 4 is a cross-sectional elevation view of the pressure reducing valve of FIG. 3, shown in an open position with darker arrows indicating fluid flow.

As best illustrated in FIGS. 3 and 4, the plunger 58 is axially received within the guide 22. Specifically, the stem 60 of the plunger 58 is received within the channel 52 extending through the ring 40, whereas the head 62 is received within the axial bore 30 defined by the retaining wall(s) 24, 26. This allows the stem 60 of the plunger 58 to translate within the channel 52. Similarly, the head 62 of the plunger 58 translates within the axial bore 30. As illustrated in FIGS. 2-5, the head 62 of the plunger 58 has a radius larger than the circular aperture 50, thus the head 62 of the plunger 58 can only translate within the axial bore 30 until the head 62 of the plunger 58 contacts the guide body 28. As previously noted, the gasket 64 is situated on the head 62 and sealingly engages with the lower side of the guide body 28 when the head 62 of the plunger 58 contacts the guide body 28, thus providing a fluid-tight seal. In some embodiments, and as illustrated, the stem 60 of the plunger 58 also includes a gasket 86 that creates a sliding seal between the stem 60 of the plunger 58 and a portion of the guide 22. This seal can prevent fluid from the valve from entering the pressure sensing cavity which will now be further described.

The pressure reducing valve 10 includes a diaphragm 66 that is compressed between the periphery of the ring 40 and the adjustment assembly housing 20 and which further centrally receives a portion of the stem 60 of the plunger 58. The coupling of the diaphragm 66 with the ring 40 and the plunger 58 defines a pressure sensing cavity 68, as is best illustrated in FIGS. 3 and 4.

While a diaphragm is found in the illustrated embodiment, it is contemplated that a piston could be used in place of a diaphragm to similar effect with the piston defining one part of a pressure sensing cavity of variable volume. So while a diaphragm is described herein, it will be readily appreciated that such a diaphragm could be replaced with a sliding piston member in other mechanical configurations and arrangements.

Situated above the valve housing 12 and the pressure sensing cavity 68 is the adjustment assembly 18. The adjustment assembly 18 includes a biasing member 70 received within the adjustment assembly housing 20 and configured to impose a downward biasing force onto the diaphragm 66 (and/or a piston if a piston is present) and the plunger 58. In some embodiments, the biasing member 70 can be a spring as illustrated.

The adjustment assembly 18 also includes retainers 72, 74 each positioned on an axial end of the biasing member 70, configured to prevent movement of the biasing member 70 and accommodate its compression and expansion. The retainer 72 includes a central aperture 76 configured to receive a threaded portion of the stem 60 of the plunger 58 therethrough. A nut 78 engages with the threaded portion of the stem 60 of the plunger 58 to secure the retainer 72 to the plunger 58. The retainer 72 includes a first side having circumferentially protruding edges that prevent movement of the biasing member 70, when an end of the biasing member 70 engages the first side of the retainer 72. Opposite the first side of the retainer 72 is a second side that engages the diaphragm 66. However, as noted above, the diaphragm 66 and pressure sensing cavity could also involve a piston instead of or in addition to the diaphragm 66.

The adjustment assembly 18 also includes nuts 80, 82 that threadingly engage a bolt 84. The nut 80 is received within the adjustment assembly housing 20. The nut 82 is located exteriorly, relative to the adjustment assembly housing 20, and engages an exterior surface of the adjustment assembly housing 20. Rotation of the bolt 84 in a first direction downwardly translates the retainer 74, which compresses the biasing member 70 and imparts a downward force on the retainer 72. The downward force on the retainer 72 then imposes a downward force on the plunger 58 and the diaphragm 66 (and/or piston, as applicable in some designs). This downward force on the plunger 58, along with other forces discussed below, can be used to set or adjust the desired outlet pressure of the pressure reducing valve 10.

Conversely, rotation of the bolt 84 in a second direction decompresses the biasing member 70, via the upward translation of the retainer 74, thus reducing the downward forces on the components discussed above.

As shown in FIG. 3, the pressure reducing valve 10 is fully assembled and in a closed configuration. As discussed above, rotation of the bolt 84 in the first direction imposes a compressive force on the plunger 58 (e.g., via the biasing member 70), which can set the outlet pressure of the pressure reducing valve 10. However, other forces also determine whether the head 62 of the plunger 58 contacts the guide 22 to seal the inlet 14 from the outlet 16 so the valve 10 remains closed or whether the head 62 of the plunger 58 separates from the guide 22 to place the inlet 14 and the outlet 16 in fluid communication with one another such that the valve 10 is open and, if the valve 10 is open, the outlet pressure of the pressure reducing valve 10. These other forces include the inlet fluid pressure, the outlet fluid pressure, the force required to unseat the plunger 58, and the pressure within the pressure sensing cavity 68. These forces are imposed on the plunger 58 and determine whether the plunger will be seated, unseated, or positioned at an intermediate position based on a biasing force. In the closed configuration of the pressure reducing valve 10 in FIG. 3, the head 62 of the plunger 58 contacts the guide 22 to seal the inlet 14 from the outlet 16. The valve 10 remains in this condition unless the biasing force is great enough to overcome the force required to unseat the plunger which requires overcoming the pressure within the pressure sensing cavity 68.

As illustrated in FIG. 3, the pressure sensing cavity 68 is in fluid communication with a venturi 88 via a channel 90 which are both part of the plunger 58. Specifically, the channel 90 provides fluid communication between the pressure sensing cavity 68 and a venturi constriction 92 of the venturi 88. As illustrated, the venturi 88 is integrated within the head 62 of the plunger 58 and the channel 90 is integrated within the stem 60 and the head 62. The venturi 88 also includes a venturi inlet 94 and a venturi outlet end 96. The venturi inlet 94 decreases in cross-sectional area, tapering toward the venturi constriction 92. In some embodiments, and as illustrated, the venturi inlet 94 includes a funnel portion 98 that increases the cross-sectional area of the inlet 94 of the venturi 88. This can allow the venturi 88 to better receive a fluid flow from the inlet 14. Similarly to the venturi inlet 94, the venturi outlet 96 decreases in cross-sectional area, tapering toward the venturi constriction 92. However, in some embodiments, the change in cross-sectional area can vary, as well as the specific cross-sections of the venturi inlet and outlet 94, 96.

In some embodiments, and as illustrated, the channel 90 has a first end that is coupled perpendicularly to the venturi constriction 92. The channel 90 has a second end opposite and perpendicular to the first end, which is in fluid communication with the pressure sensing cavity 68. As best illustrated in FIGS. 3 and 4, the channel 90 extends in a straight manner from the first end until abruptly changing orientations perpendicularly, defining an "L-shape" of the channel 90. Although the channel 90 is generally an L-shape as illustrated, other configurations are possible. For example, in some embodiments, the second end of the channel 90 can be angled obliquely relative the straight first end of the channel 90. Still other embodiments include one continuous curved channel 90.

FIG. 4 illustrates the pressure reducing valve 10 in an open state in which when the plunger 58 is unseated because the spring force is sufficient to open the valve 10 by displacing the plunger 58 against the collective biasing force of the pressure sensing cavity 68. When the pressure reducing valve 10 is in an open configuration (shown in both FIGS. 4 and 5), fluid can flow through the valve 10. Following the arrows in FIGS. 4 and 5, a fluid is received at the inlet 14 of the valve housing 12 at a specific inlet fluid pressure and having a specific inlet flow rate. The fluid flows from the inlet 14, through the openings 42, 44, 46, 48 of the guide 22, and then down (down, at least relative to the orientation of FIG. 4) through the circular aperture 50 of the guide body 28. Then, a portion of the fluid flow 100 flows into the fluid conduit 102, allowing the portion of fluid flow 100 to flow into and through the venturi 88, via the venturi inlet 94. Another portion of the fluid flow 104, flows around the head 62 of the plunger 58. Both the portions of fluid flow 100, 104 converge and are expelled via the outlet 16.

Figure 5:
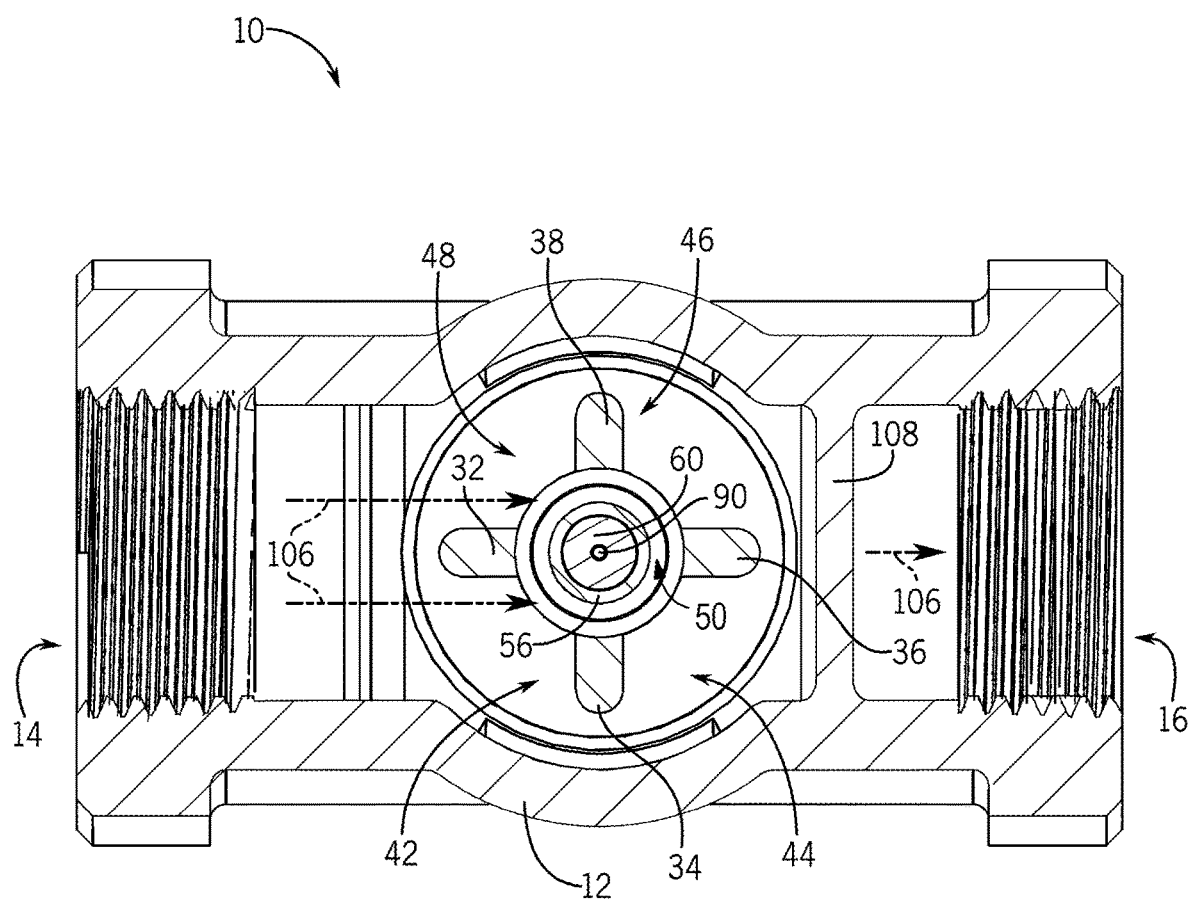
FIG. 5 is a cross-sectional plan view of the pressure reducing valve of FIG. 1, taken along line 5-5 of FIG. 4 and shown in an open position.

Referring specifically to FIG. 5, the cross-sectional view taken at line 5-5 of FIG. 4, further helps to illustrate the fluid flow path through the pressure reducing valve 10, when the pressure reducing valve 10 is in an open position. The flow passes between the supports 32, 34, 36, 38 of the guide 22 with the fluid flow, designated by number 106, flowing through the inlet 14 and through the openings 42, 44, 46, 48 and down the aperture 50 of the guide 22. A wall 108 of the valve housing 12 prevents the fluid flow 106 from flowing to the outlet 16 other than by the above-mentioned path. After passing through the aperture 50, the fluid flow 106 then exits to the outlet 16, after flowing around the head 62 of the plunger 58, or through the venturi 88.

The portion of fluid flow 100 that flows through the venturi 88 specifically flows through the venturi constriction 92 and out the venturi outlet end 96. The flow within the venturi 88 and through the venturi constriction 92 is converted into a decreased fluid pressure (in relation to the outlet pressure) that is delivered to the pressure sensing cavity 68 via interconnecting channel 90. Thus, the venturi constriction 92 allows for a pressure delivered to the plunger 58 (via the pressure sensing cavity 68) to be dependent, at least in part, on an outlet flow rate of the outlet 16 with the rest of the force being applied by the biasing member/spring 70. This venturi 88 allows for a real-time feedback mechanism to the biasing member 70, which adjusts the plunger 58 in order to better maintain the set outlet fluid pressure contra to the conventional fall-off pressure that occurs at higher flow rates.

Figure 6:
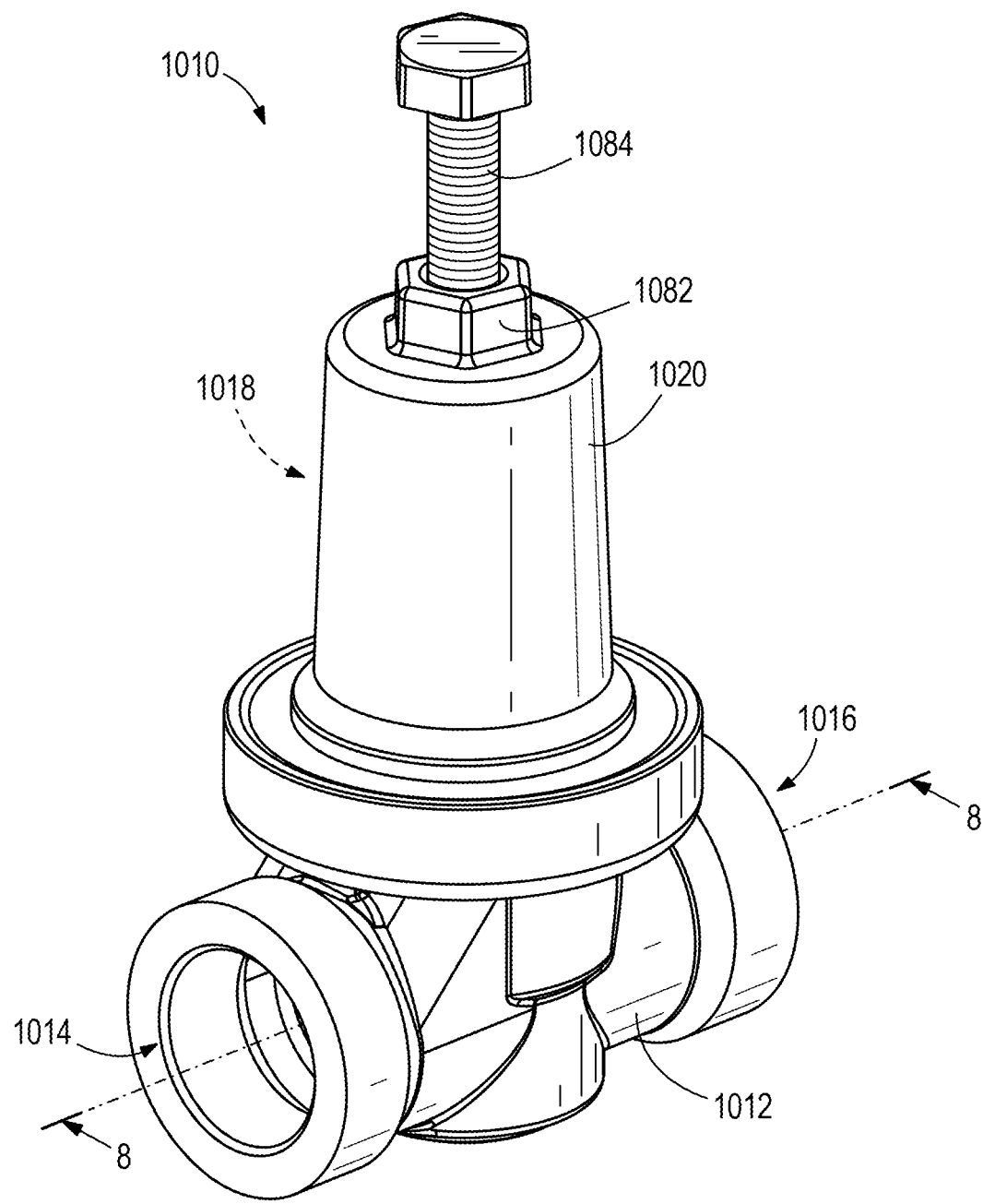
FIG. 6 is a perspective view of another pressure reducing valve.

With reference to FIG. 6, a pressure reducing valve 1010 according to another embodiment is shown. Many components of the pressure reducing valve 1010 are similar to those of the pressure reducing valve 10 discussed above and have been given a reference numeral that is a value of one thousand higher than the corresponding similar component in the pressure reducing valve 10 discussed above. For the sake of brevity, only some differences between the pressure reducing valve 10 and the pressure reducing valve 1010 will be discussed below.

Figure 8:
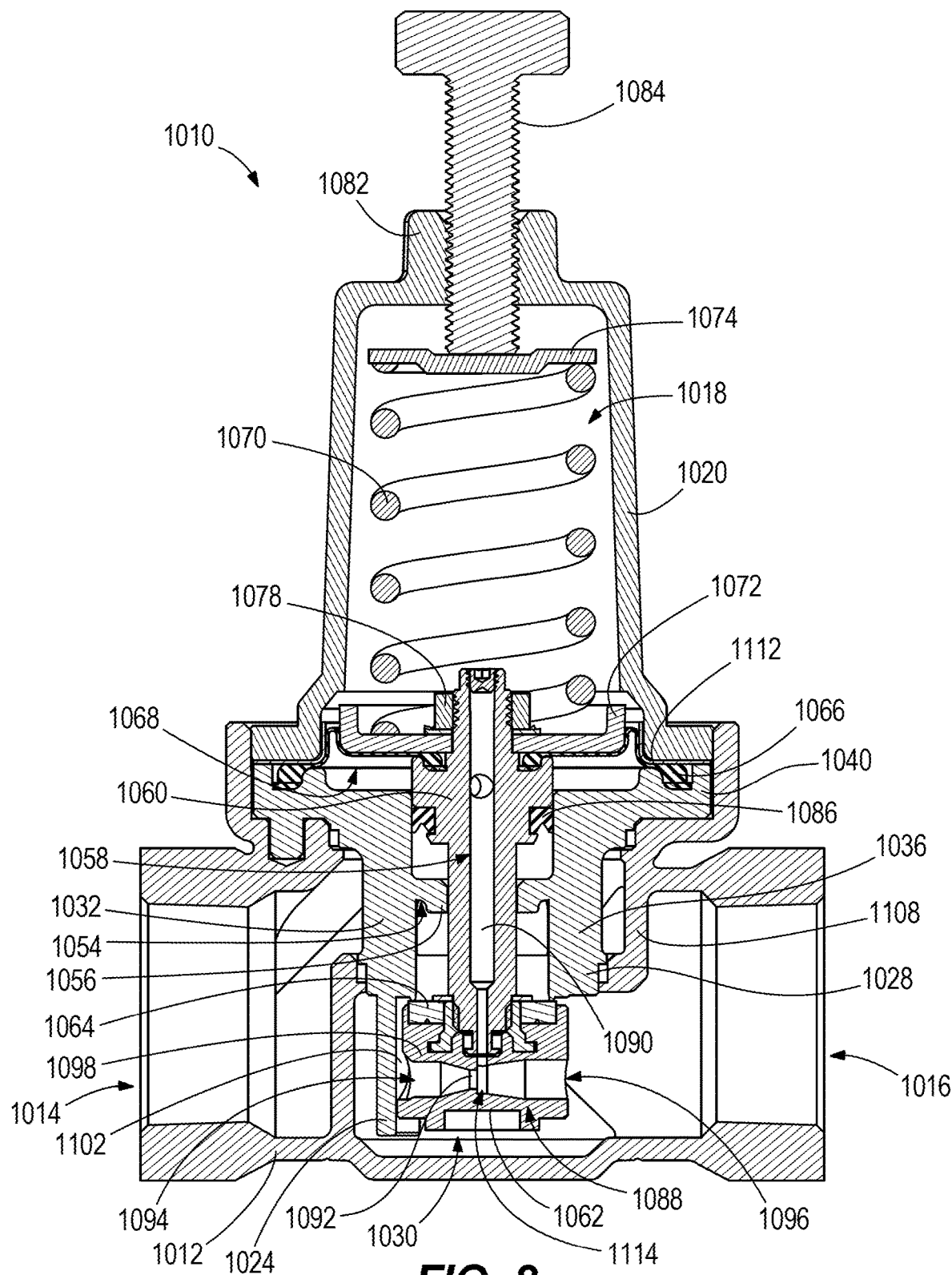
FIG. 8 is a cross-sectional elevation view of the pressure reducing valve of FIG. 6 taken along line 8-8 of FIG. 6 and shown in a closed position.

As shown in FIG. 6, the pressure reducing valve 1010 also includes an adjustment assembly 1018 having a nut 1082. In this embodiment, however, the nut 1082 is permanently affixed to or integrally formed with the adjustment assembly housing 1020. As shown in FIG. 8, this configuration allows for the exclusion of an interior nut (such as the nut 80 discussed above). Instead, the end of the bolt 1084 can directly engage the retainer 1074.

Figure 7:
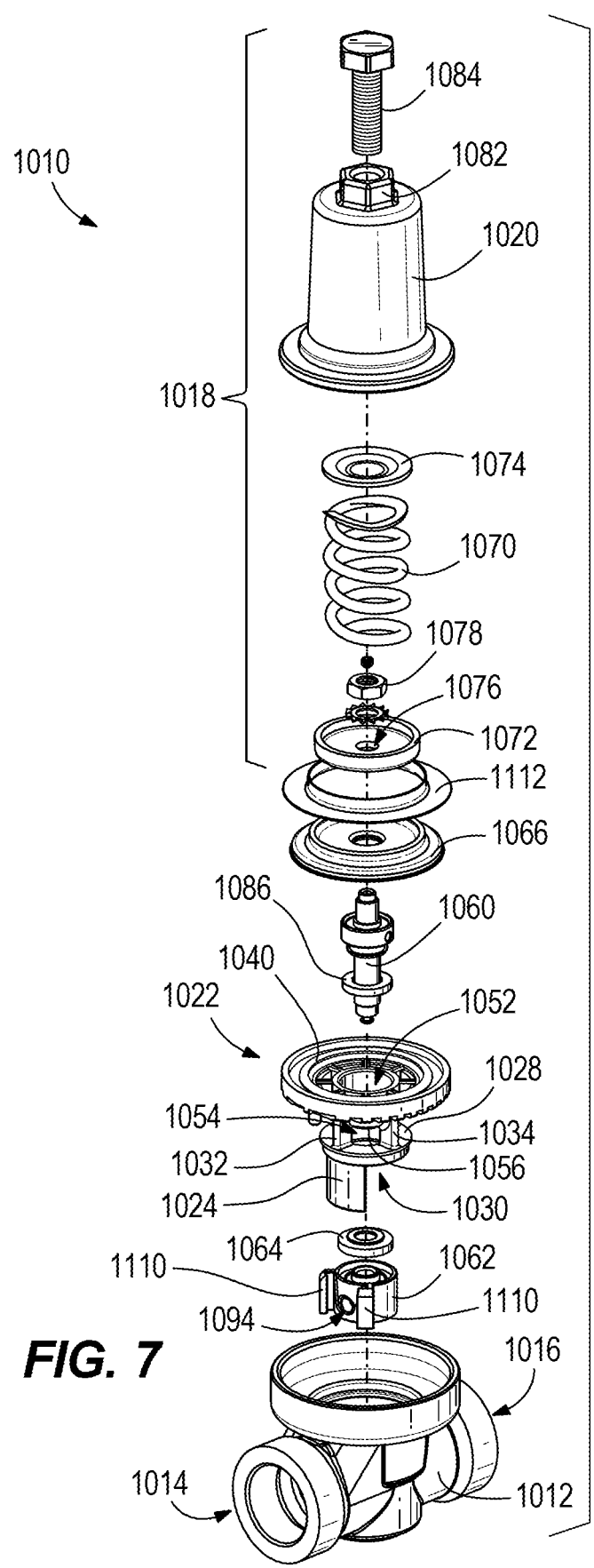
FIG. 7 is an exploded perspective view of the pressure reducing valve of FIG. 6

With reference to FIG. 7, the guide body 1028 includes only one retaining wall 1024. This retaining wall 1024 serves as a rail. The head 1062 of the plunger 1058 includes two opposing hooks 1110 extending outwardly. Each hook 1110 defines a groove to receive a portion of the retaining wall 1024. As such, the retaining wall 1024 is trapped by the hooks 1110, and the head 1062 of the plunger 1058 is constrained to translate linearly relative to the retaining wall 1024.

The hooks 1110 are disposed on opposite sides of the venturi inlet 1094. The hooks 1110 and the retaining wall 1024 cooperate to form, along with the funnel portion 1098 of the venturi inlet 1094, the fluid conduit 1102. In some embodiments, this bounded fluid conduit 1102 may prevent eddies or other turbulent fluid flow characteristics from forming around or in the venturi 1088.

Also shown in FIG. 7, the pressure reducing valve 1010 includes a friction ring 1112 positioned between the diaphragm 1066 and the adjustment assembly housing 1020 such that the diaphragm 1066 does not move with the adjustment assembly housing 1020. This configuration may avoid wrinkling or tearing of the diaphragm 1066.

As illustrated in FIG. 8, the head 1062 of the plunger 1058 includes a low pressure zone 1114 defined therein. In the embodiment shown, the low pressure zone 1114 is disposed immediately downstream from the constriction 1092. The channel 1090 is in fluid communication with this low pressure zone 1114 such that the pressure sensing cavity 1068 experiences a fluid pressure that is lower than the fluid pressure at the valve outlet 1016.

Figure 9:
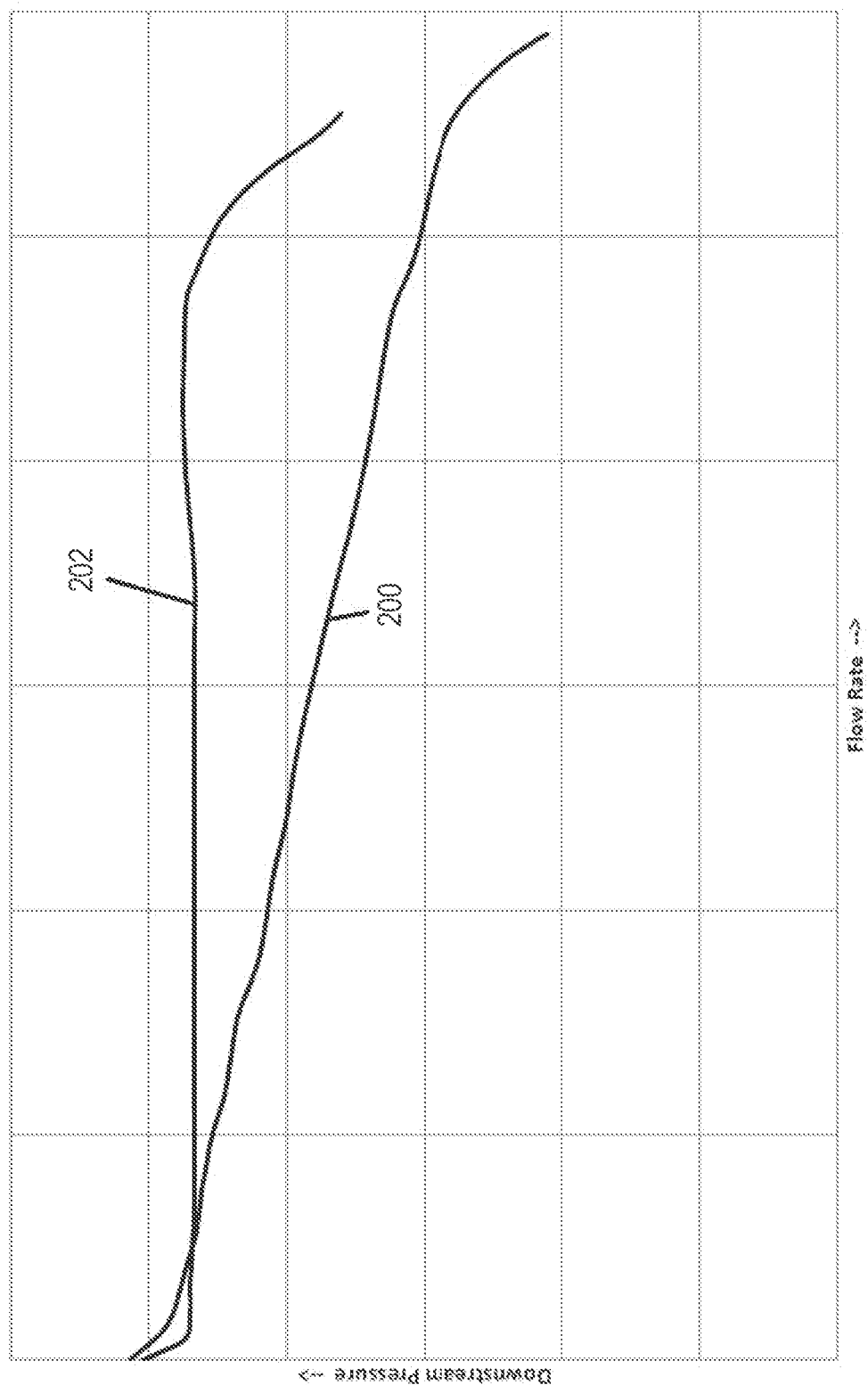
FIG. 9 is a graph of the downstream pressure verses the flow rate for both a typical pressure reducing valve and an embodiment of the pressure reducing valve of the present disclosure.

To help illustrate the technical improvement(s) provided by embodiments disclosed herein, FIG. 9 illustrates two different "(outlet pressure) versus (outlet flow rate)" curves. A first curve 200 is formed from data taken regarding a typical pressure reducing valve without an integrated venturi. For the first curve 200, as the flow rate increases, the outlet pressure correspondingly drops. This increase in flow rate can be attributed to an increase in downstream demand (e.g., opening of additional valves, faucets, etc.). Regardless, as the flow rate increases, the valve opens further to supply the increase in flow rate, but results in a decrease in the outlet fluid pressure in so doing. Thus, there is a relationship between an increase in the outlet flow rate and a decrease in the outlet fluid pressure. A second curve 202 is formed from data taken regarding an embodiment of the pressure reducing valve with an integrated venturi of the present disclosure. As illustrated in FIG. 9, the second curve 202 is roughly horizontal as the outlet fluid pressure is constant. This is the case because, as the flow rate increases, the venturi 88, 1088 supplies a pressure to the diaphragm 66, 1066 (and/or piston) which alters the biasing force and helps to maintain the set outlet pressure. Particularly, as the flow rate increases, the venturi 88, 1088 supplies a reduced pressure to the pressure sensing cavity 68, 1068.

Thus, referring to FIGS. 1-8 collectively, the pressure feedback of the pressure reducing valve 10, 1010 can be more easily understood. For the pressure reducing valve 10, 1010 in an open configuration, the fluid flow pathways have already been discussed. However, suppose the downstream flow rate increases (e.g., via opening of additional valves, faucets, etc.). In this case, the increase in fluid flow is received by the venturi 88, 1088, and specifically the venturi constriction 92, 1092. The venturi constriction 92, 1092 decreases the delivered pressure to the pressure sensing cavity 68, 1068 as the fluid flow has increased, corresponding to the venturi effect. This decrease in pressure within the pressure sensing cavity 68, 1068 imparts a lesser upward force on the plunger 58, 1058 and correspondingly opens the valve 10, 1010 further (e.g., due to the downward biasing force by the biasing member 70, 1070). So, as the outlet fluid flow increases, there exists an inherent pressure drop, but the venturi constriction 92, 1092 imparts a counteracting decrease in pressure based on the outlet fluid flow, essentially canceling at least a portion of the decreased change in outlet fluid pressure.

Conversely, the pressure reducing valve 10, 1010 can also compensate for increases in outlet pressure. For example, suppose that the outlet fluid pressure increases proportionally to the outlet flow rate (e.g., via a decrease in outlet flow rate due to closing of additional valves, faucets, etc.). The decrease in outlet flow rate is sensed by the venturi 88, 1088 and specifically the venturi constriction 92, 1092. The venturi constriction 92, 1092 increases the delivered venturi pressure to the pressure sensing cavity 68, 1068, imparting a greater upward force on the plunger 58, 1058 and correspondingly closing the valve 10, 1010 further. So, as the outlet fluid flow decreases, there exists an inherent pressure drop, but the venturi constriction 92, 1092 imparts a counteracting increase in pressure based on the outlet fluid flow, essentially canceling at least a portion of the change in outlet fluid pressure.

It will be noted that, while a pressure reducing valve 10, 1010 with a venturi 88, 1088 in the plunger 58, 1058 has been illustrated, it is contemplated that other low pressure features (other than a venturi) can also be used or placed to similar effect in the plunger 58, 1058. For example, it is contemplated that in place of the illustrated venturi 88, 1088, there could be a low pressure zone produced with one or more obstructions or the like. As another example, it is also contemplated that in place of the illustrated venturi 88, 1088, there could be a hydrodynamic foil directing high speed flow between a narrow gap between two plates. Additionally, rather than using a conventional venturi construction, it is contemplated that other flow patterns may be employed. Further, one or more sensors may be located within the plunger 58, 1058 that detects low pressure conditions and converts this to an adjustment in the biasing force applied to the plunger 58, 1058 in a digital manner utilizing a controller.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A pressure reducing valve, the pressure reducing valve comprising:
   a valve housing including an inlet in selective fluid communication with an outlet;
   a plunger coupled to a biasing member including a diaphragm and/or piston having a pressure sensing cavity, the plunger positioned between the inlet and the outlet;
   a venturi integrally formed within the plunger, the venturi having a venturi inlet end and a venturi outlet end with a venturi constriction therebetween;
   a channel integrally formed within the plunger, the channel providing fluid communication between the venturi constriction and the pressure sensing cavity; and
   wherein the venturi constriction is configured to sense and deliver a fluid pressure to the pressure sensing cavity of the biasing member via the channel to adjust a biasing force applied to the plunger by the biasing member.

2. The pressure reducing valve of claim 1, wherein the plunger includes a stem end and a head end opposite the stem end.

3. The pressure reducing valve of claim 2, wherein the venturi is integrally formed within a head at the head end of the plunger.

4. The pressure reducing valve of claim 3, wherein the channel is integrally formed within a stem of the plunger and is perpendicular relative to the venturi.

5. The pressure reducing valve of claim 2, wherein the biasing member further includes a spring, wherein a stem end of the plunger is concentrically positioned relative the spring, and wherein the spring surrounds the stem end of the plunger.

6. The pressure reducing valve of claim 1, wherein the biasing member further includes a spring and in which a force of the spring and a force of the diaphragm and/or piston are in opposite directions to one another and are summed to establish the biasing force applied to the plunger.

7. The pressure reducing valve of claim 6, wherein the spring is not within the pressure sensing cavity.

8. The pressure reducing valve of claim 6, further comprising an adjustment mechanism for the biasing member, the adjustment mechanism being configured to rotate in a first direction to load the spring and to rotate in a second direction to unload the spring.

9. The pressure reducing valve of claim 8, wherein an amount of rotation of the biasing member corresponds to an outlet fluid pressure of the outlet.

10. The pressure reducing valve of claim 1, wherein the diaphragm and/or piston is sealingly engaged with the plunger to define a portion of the pressure sensing cavity.

11. The pressure reducing valve of claim 1, further including a guide member positioned within the valve housing.

12. The pressure reducing valve of claim 11, wherein the guide member includes an axial bore that receives the plunger; and
   wherein the plunger translates within the axial bore of the guide member.

13. The pressure reducing valve of claim 12, wherein the guide member further includes an aperture in selective fluid communication with the axial bore; and
   wherein the aperture has a smaller radius than the axial bore.

14. The pressure reducing valve of claim 13, wherein the guide member further includes an opening adjacent to the aperture and on the opposite side of the aperture from the axial bore, the opening allowing selective fluid communication between the opening and the aperture.

15. The pressure reducing valve of claim 14, wherein the head end of the plunger is configured to engage a surface of the axial bore, thereby preventing fluid communication between the opening and the axial bore.

* * * * *